Dec. 25, 1934.  A. A. DAHMS ET AL  1,985,766
RAILROAD CAR DRIVE
Filed June 3, 1931  2 Sheets-Sheet 1

Dec. 25, 1934.  A. A. DAHMS ET AL  1,985,766
RAILROAD CAR DRIVE
Filed June 3, 1931   2 Sheets-Sheet 2

Inventors
A. A. Dahms
J. C. Knudsen
by G. P. O'Shea
Attorney

Patented Dec. 25, 1934

1,985,766

UNITED STATES PATENT OFFICE 1,985,766

RAILROAD CAR DRIVE

Alfred A. Dahms, Chicago, Ill., and Thomas C. Knudsen, Milwaukee, Wis., assignors to Allis-Chalmers Manufacturing Company, Milwaukee, Wis., a corporation of Delaware Application June 3, 1931, Serial No. 541,806

15 Claims. (Cl. 105—101)

This invention relates in general to the art of transmitting power by means of belts and relates more specifically to a mechanical power transmitting drive comprising a V-groove driving pulley secured to a rotary shaft free to partake of swiveling or arcuate movement, a V-groove driven pulley and a V-type flexible and resilient belt or belts for transmitting the rotary movement of said driving pulley to said driven pulley.

An object of the invention is to provide a straight drive as related above in which the grooves in the driving and driven pulleys are formed and designed to permit the flexible and resilient V-belts operating in said grooves to effect their power transmitting function without their turning over on their sides or jumping out of the grooves of the pulleys while the rotating driving axle swivels or partakes of a substantial arcuate movement, or in other words while the drive operates under conditions of considerable misalignment.

A more specific object of the invention is to provide a multiple V-belt straight drive for driving railroad car dynamos or other power transforming or absorbing machines, from an axle rotatively carried in a truck frame swiveled to the car and with the dynamo or equivalent machine fixed against movement transversely of the car.

Another object of the invention is to provide a straight drive as related above which may advantageously be used on any carriage or vehicle having a rotating axle or shaft partaking of a substantial arcuate movement under either the condition where the power of a motor is transmitted to the running axle of the vehicle or where the axle is used to transmit power to drive apparatus, such as dynamos, compressors and ventilators.

Another object of the invention is to provide a straight drive for driving the generators of railroad cars and including endless V-belts having dry or hard driving surfaces (as distinguished from tacky) and being integrally formed waterproof construction to preclude the natural detrimental effects due to the action of entering water and the subsequent freezing of said water therein to which harmful actions the spliced belts heretofore used are continuously subjected.

A further specific object of the invention is to provide an improvement in flexible belt, straight drives for driving generators of railroad cars from one of the car axles, the generator being attached to the car body, which is simpler than the drives of this type heretofore used on said cars and in which the "life" of the belts is substantially longer than that of the spliced flat belts heretofore used for the same purpose.

Another object of the invention is to provide a straight, V-belt drive, for railroad car generators which may be applied to certain present day railroad cars with but slight adjustments and modifications of conventional parts thereof, which is inexpensive, durable and highly satisfactory in operation.

Other objects and advantages of the present invention will become apparent from a consideration of the detailed description of an embodiment thereof in the specification and of the drawings accompanying same, and on which the same reference numerals are employed to designate the same parts throughout the various views.

Figure 1:
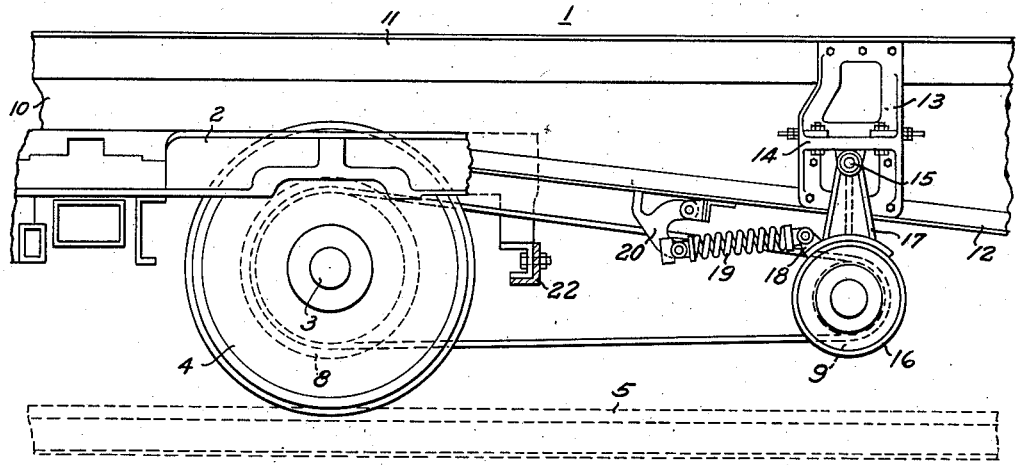
Fig. 1 is a fragmentary side view of a portion of the wheeled supporting structure of a railroad car and shows the invention in straight drives applied to an axle and electric generator thereof.
Figure 2:
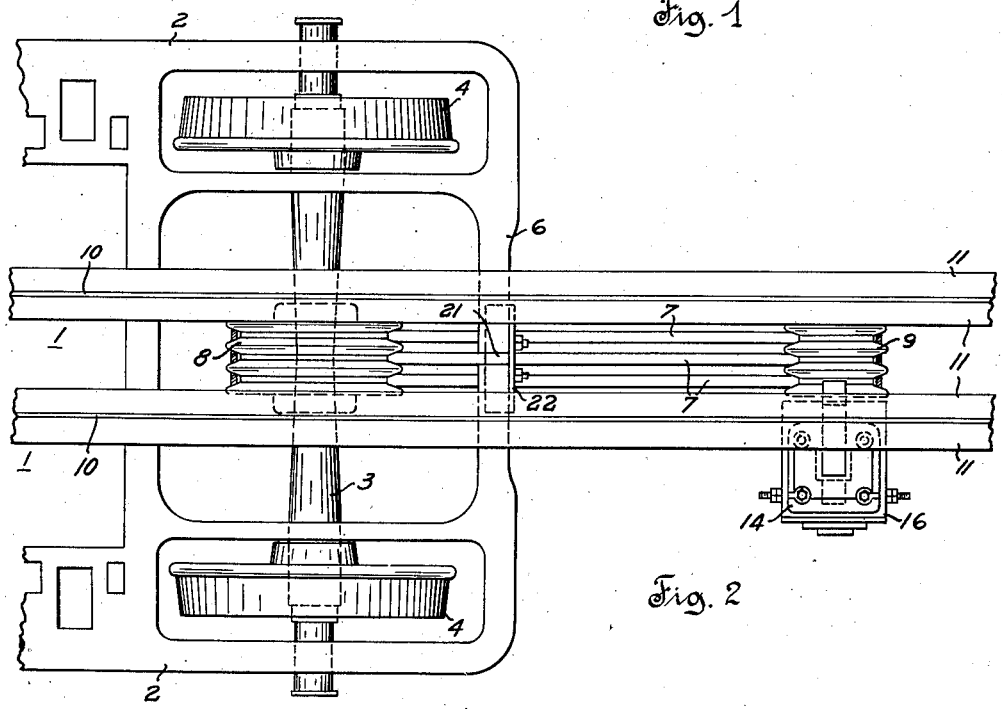
Fig. 2 is a plan view of the construction shown in Fig. 1 and illustrates the relation between the elements constituting this invention in straight drives and the swiveled car truck frame and the supporting beam structure for the car body, when the car is on a straight track, the elements of the drive being under a condition of zero misalignment.

The application of flexible belt drives for driving electric generators from railroad car axles presents many problems. The first of these is that the drive must be located below and externally of the car body and therefore is subjected to the action of the elements tending to rust the pulleys which should be made of rustproof material, and to deteriorate the belts thereof, which heretofore in the simple or straight types of belt drives have generally been spliced so as to permit the application of the drive to the axle of the car, said deterioration being due to moisture getting into the belts at their points of junction and which moisture, if allowed to freeze, frequently results in early breaking of the belts.

This invention permits the use and application of the simple and desired or straight-type, flexible belt drives to certain existing railroad car axles with only a slight change in a present conventional part of the cars and employs endless belts of water-proof, rubberized integral construction, devoid of mechanical splices, and therefore properly solves the first problem stated.

Another problem connected with the above stated application of drives is presented by the fact that the truck frame, one of whose axles is to serve as a source for transmitted rotary movement, swivels with respect to the car body and therefore also with respect to a car-body attached electric generator. In simple or straight type of belt drives, ball and socket arrangements for the pulley on the swiveling axle or shaft have been used on railroad cars, but with little success. Some such expedient must be employed if a single flat belt is to comprise an element of the simple or straight type of belt drive as is common in the prior art car axle generator drives. The present invention uses one or a plurality of individually-resilient, flexible belts having side driving surfaces to take the place of the single flat belt of the prior art drives of this type and has the grooves in the driving and driven pulleys formed to take belts of the required dimensional and mechanical characteristics, to permit the straight drive to accommodate itself to the ordinary misalignments of the drive elements to which the drive is subjectable because of the location of one of the elements thereof on the swiveled axle, with minimum tendency of the belts to turn over on their sides or to jump out of the grooves in the pulleys during transportation of the car. In this manner, the second problem stated is effectively solved.

Further this invention is directed to a car body-attached straight generator drive as contradistinguished from a truck-frame-attached, non-straight, generator drive. If the generator which may in some cases weigh nine hundred pounds or over, is secured to the truck frame, the vibrations therein may be so great that the metal securing or generator attaching elements reach their fatigue limit early and the support for the generator accordingly soon may fail, a highly undesirable condition. Obviously the vibrations in the car body are not as great nor as extensive as those in the truck frame and therefore the supporting means for a generator when carried from the car body will not be so influenced, nor fail as early. Not alone is the location of the generator on the truck frame undesirable as far as the generator supporting means is concerned, but also because the generator itself is subjected to detrimental conditions because of said vibrations, since the windings of the generator may be shaken loose which would tend to cause an electrical failure of the generator.

The truck-frame-attached generator drives are further less desirable than the car body-attached generator drives, since they are usually not simple or straight types of drives and therefore contain an additional element or idler pulley not required in the straight drive of this invention. By the expression simple or straight type of belt drive is meant a belt drive using only two pulleys and in which neither of the belt runs between the pulleys is deflected by a third pulley.

Having now explained the principle underlying this invention a specific embodiment thereof will now be described in detail.

Reference numeral 1 represents composite beam members for carrying the car body, not shown, from a pair of wheeled truck frames 2 located adjacent to each end of the car body, as is the usual practice. Each truck frame may have journaled therein three parallelly spaced shafts or axles 3 having wheels secured thereto, in which case the truck frame swivels coincident with the central point of the intermediate axle or shaft 3, not shown, and said wheels being provided with the usual flanges for retaining the truck frames 2 on the rails 5 during transportation of the car thereover. In the construction illustrated, the truck frame 2, as is usual in certain railroad cars, has a transverse member 6 located approximately in the plane determined by a pair of axles of the two truck frames of the car, which relation requires modification of this transverse member 6 in order to adapt the drive of this invention to the driving of generators as at present carried on these certain railroad cars, in the manner later to be described.

The drive of this invention includes one or a plurality of endless V-type belts 7 of water-proof construction throughout and devoid of mechanical splices, to preclude the possibility of moisture entering the material of which the belts are made and into the splices and the subsequent freezing of said water which would be detrimental to the life and strength of the belts. The V-belts in the disclosed drive have preferably 40° included angles between the inclined side driving surfaces thereof and ride in the complementary grooves in a split V-groove driving pulley or sheave 8, split to facilitate its attachment to the medial portion of a shaft 3 of a truck frame 2, so as to be located adjacent the transverse member 6 of said truck frame which is closest to the middle of the car and these belts also ride or operate on a driven V-groove generator pulley or sheave 9.

The relation of driving pulley 8 and driven pulley 9 is such that the grooves thereof are in alignment and determine as do the V-belts operating in the V-grooves, vertical planes parallel to the longitudinal medial line of the car when the car is on a straight track in which case the truck frame 2, the car body, and the elements of the straight drive are in parallelism. Obviously, this parallelism is destroyed when the car is traveling over or along curves in the track and the relation between the operating planes of the V-belts 7 and the planes of rotation of the driving and driven pulleys 8 and 9, under such conditions is hereinafter referred to as the misalignment of the drive. When a substantial angle of misalignment occurs it tends to cause the belts to leave their cooperating grooves in the pulleys, but this is effectively prevented according to this invention as will later appear.

Each composite beam member 1, of which a pair are shown equally spaced and parallelly located with respect to the longitudinal medial line of the car body which the beams directly support, comprises a vertical web plate 10 having secured thereto oppositely disposed angle members 11 terminating in the line formed by the substantially horizontal upper edge of the web plate 10, and a pair of oppositely disposed angle members 12 terminating in the line formed by the lower inclined edge or boundary of the web plate 10, said edge being inclined downwardly toward the middle of the car to provide the desired beam support for the car body. The specific formation of the beam members 1 is not material as far as this invention is concerned, but a possible formation thereof has been fully disclosed, in order to facilitate an understanding of this invention in railroad car generator, straight drives.

In the practice of this invention the present bracket and generator suspending means of certain railroad cars may be used. Said means comprises a substantially rectangular frame or bracket 13 having marginal reinforcing ribs and a projecting horizontal web 14 provided with a depending ear which has a horizontal bore in alignment with a similar bore in a web plate 10 to receive a generator suspending pin 15. The bracket may be designed to permit of adjustment of the location of the generator suspending pin 15 with respect to the axis of the shaft or axle 3 on which the driving pulley 8 is mounted.

The electrical generator 16 has a forked frame 17 attached to its casing, the free ends of said frame being provided with aligned bores adapted to receive the generator suspending pin 15 for the purpose of pivotally suspending the generator 16 from the car body. The forked frame 17 is provided with an external, radial ear 18 in its circular base portion to which one end of a compression spring 19 is pivotally secured, said spring having its other end pivotally secured to an arm of a two-armed member 20 pivotally secured to the composite beam member 1 to which the bracket 13 is secured. This locates the middle point of the grooved surface of the driven pulley 9 which corresponds to the grooved surface of the driving pulley 8 substantially directly below the longitudinal medial line of the car body, which relation can then be readily effected by sliding the driven pulley 9 on the generator shaft the required distance. The compression spring 19 normally urges the suspended generator pulley 9 in a direction to maintain the belts 7 under the required tension, and absorbs some of the kinetic energy of movement of the suspended generator and pulley when the car is abruptly moved to the right, as viewed in Fig. 1. It may here be noted that the swiveling of the driving shaft 3 causes the belts 7 to be additionally tensioned when the car moves along curves in the track.

As appears from Fig. 1 when the drive of this invention is applied to a present form of certain railroad car having truck frames and generator suspending means as illustrated, the transverse member 6 of the truck frame lies within the orbit of movement of the V-belts 7. In order to permit the replacement and application of the endless belts 7 on the pulley arrangement shown in said figure upon detaching the journals, not shown, from the particular truck frame and then effecting a vertical displacement of the axle 3 to which the driving pulley 8 is applied, with reference to the truck frame 2, which permits slipping over the wheels and journal of the endless V-belts 7, a transverse slot 21 is cut through the medial portion of the transverse member 6 of the truck frame 2. Then after having passed one run of each endless belt 7 through the transverse slot 21, the belts may be placed on the pulleys 8 and 9 and the transverse member 6 will then be within the orbit of movement of the belts 7 and sufficiently removed therefrom to prevent rubbing thereon during operation of the drive. A suitable iron member 22 detachably secured to the transverse member 6, as by bolts, serves to give this member substantially its former strength, while facilitating the application of the endless belts 7 upon failure due to wear or any cause of the previously applied belts.

Figure 3:
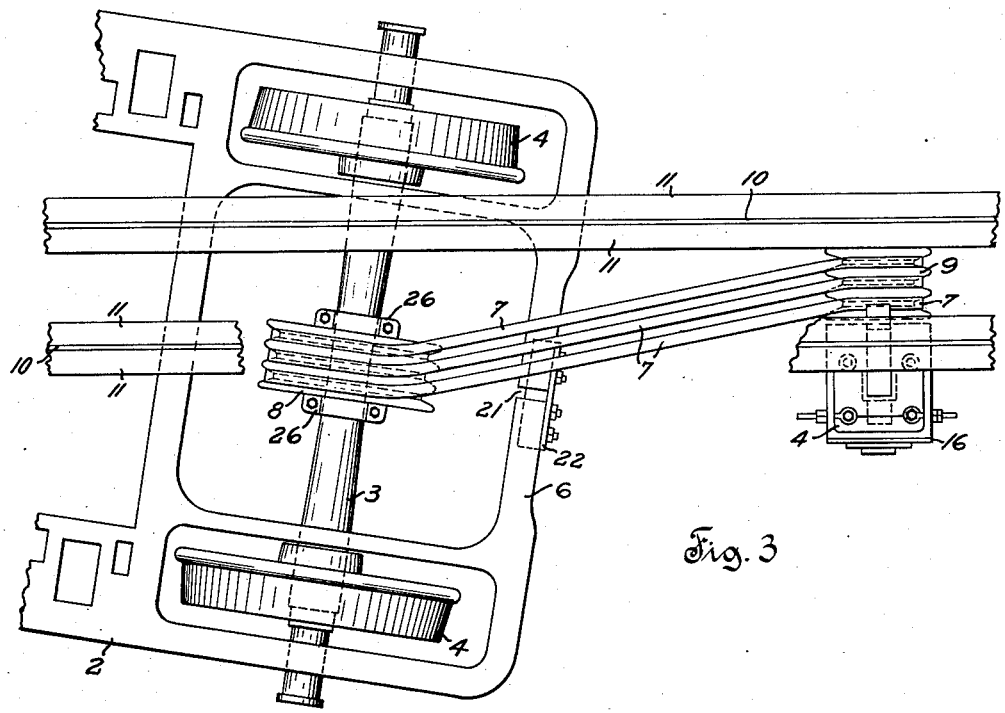
Fig. 3 is a view similar to Fig. 2, a part of the supporting beam structure having been broken away to clearly illustrate the maximum misalignment of the elements of the straight drive which the drive must successfully accommodate when the railroad car to which it is applied is moving along a maximum curvature in the tracks, namely, 7° 30'.

In order to provide satisfactory operation of the drive when the car on which it is applied is negotiating curves which rarely exceed 7° 30' and to keep the belts of the drive from jumping out of the grooves of the pulleys and to prevent the turning of the V-belts on their sides, while remaining in the grooves, which might occur as stated above under the misalignment condition of the belts 7 with respect to the grooves of the driving pulley 8 and under the accompanying misalignment condition of a certain magnitude of the belts 7 with respect to the grooves of the driven pulley 9, the grooves in these pulleys are of special formation. In Fig. 3 the truck frame 2 is represented as being rotated through an arc of 7° 30', the distance between its swiveling axis and the axis of the driving pulley 8, being 5' 3", and the distance between the axis of the driving pulley 8 and the axis of the driven pulley 9, being approximately 5' 6½". This results in an included angle between the planes of operation of the belts 7 and the grooves in the driven pulley 9 of about 7° and an included angle of 7° plus 7° 30' or the substantial angle of 14° 30' between the radial line passing through the middle groove of the driving pulley 8 in the plane of rotation thereof and the plane of operation of the middle belt 7.

Figure 4:
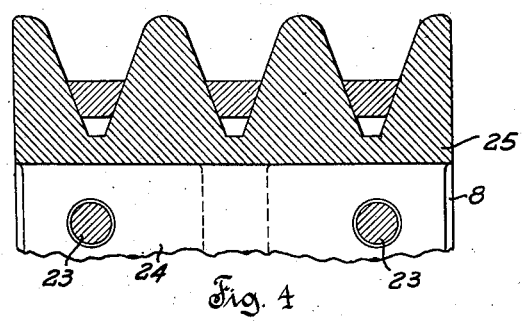
Fig. 4 is an enlarged fragmentary, longitudinal sectional view of the split driving pulley mounted on the car axle and shows the means for uniting the split sections and the form of the grooves, to permit the elements comprising the drive to accommodate the maximum misalignment thereof illustrated in Fig. 3.

Now referring to Fig. 4 showing a sectional detail of the driving pulley 8, shown in the remaining figures, which has approximately a 17" pitch diameter and which drives through the endless V-belts 7 of approximately 175" pitch lengths, (said pitch lengths being measured along either side driving surface of the V-belts at points in said surface approximately mid-way of its width) the smaller pitch diameter driven or generator pulley 9, the specific formation of the grooves to permit satisfactory operation of the drive, even under conditions of the stated maximum misalignment will be described in detail. This figure shows the pulley 8 as having a peripheral rim 25 provided with the novel grooves, said rim being connected to the central hub having securing flanges 26 by means of integral ribs 24. The pulley is split to facilitate its application to the axle 3 and the split sections are securely held together by means of bolts 23 passing through aligned openings in adjacent ribs 24.

The grooves in the rim 25 of the driving pulley 8 and the grooves in the periphery of the driven pulley 9, which need not be a split pulley, may be of the same form and size. The bottom portion of the grooves which terminates in the plane of the maximum width of the belts 7 when in their seated positions, as illustrated in Fig. 4, is bounded by equally but oppositely inclined smooth straight-line-side-driving surfaces sufficiently spaced to provide a free space at the extreme bottom of each groove when a V-belt having complementary smooth side driving surfaces with preferably an included angle of 40° and a thickness of ⅝" and a maximum width of ⅞" rides in the bottom portion of the novel groove of pulleys 8 and 9 and with the medial thickness of the belts 7 approximately coincident with the pitch diameters of these pulleys. Above this bottom portion the grooves are defined by outwardly continued surfaces which function to guide the belts into wedging engagement with the bottom or belt seating portion of the grooves and prevent the natural tendency of the V-belts when operating under the stated maximum misalignment condition, to climb out of the grooves or to turn over on their sides. These outwardly continued guiding surfaces have been theoretically determined and found to be curved annular surfaces but continuing in the general direction of the straight-line-inclined surfaces of the bottom portion of the grooves, to provide a non-uniformly flared groove portion above the bottom groove portion or standard groove of standard depth. These theoretically curved guiding surfaces only extend for a distance of approximately the width of the side driving surfaces of the V-belts, as stated, of ⅞" maximum width, ⅝" thickness and 40° included angles, since the leading edge of the belt which first makes contact with the guiding surface before the trailing edge subsequently makes contact with said guiding surface, first requires a guiding contact at this distance for a 14°, 30' deflection or misalignment of the belt. At this point or distance the material between adjacent grooves is extended peripherally and bounded or defined by preferably an arcuate surface smoothly terminating in said theoretically curved guiding surfaces to provide a sufficiently blunt edge for the land between adjacent grooves, to preclude breakage thereof by solid bodies which may be thrown thereagainst when the car to which the pulleys of this invention in flexible belt, straight drives is applied is speeding along a track. Since the theoretically curved guiding surfaces depart at their required distance or width by only about 1/32" from straight line guiding surfaces continuing in the planes of the straight line side driving surfaces of the bottom portion of the grooves, in practice the grooves may be formed with continuously flat sides, to obviate the additional machining required to produce the theoretical curved guiding surfaces, as shown in Fig. 4.

The overall depth of each groove must be considerably more than the maximum width of the belts 7 and the peripheral portion or summit of the material of the rim forming the land between adjacent grooves as stated before is given a preferably arcuate curvature as illustrated in Fig. 4 of a radius of approximately two-thirds the value of the thickness of the belts 7.

The guiding surfaces and peripheral arcuate surfaces terminating in the former are therefore such as to cause each belt 7, even under conditions of maximum misalignment of the drive, to enter its groove with a substantially lineal translation or displacement of successively entering cross-sections thereof and without pivoting of the same on the guiding surfaces of the grooves, which would tend to cause the belts to turn over on their sides while entering their grooves and thus to become improperly positioned therein which is to be avoided.

While the invention in flexible belt, straight drives has been illustrated in connection with a railroad car for the purpose of supplying rotary movement for the car lighting electric generator from an axle of said car, and the description has fully set forth a practical embodiment of a drive for said purpose, it is to be understood that its application is not limited thereto, but the drive may be employed for any similar purpose as for driving refrigerators, compressors, ventilators, etc., from a rotating element swiveled with respect to a rigid body which carries the drive shaft of a power absorbing or transforming machine in non-swiveling manner and which is to receive energy of rotation from said swiveled rotary element. In short the invention in flexible belt, straight drives is employable as a power transmission means wherever the stated misalignment of swiveled driving shaft and non-swiveling driven shaft may be present within certain limits, and is employable where a non-swiveling misalignment is present as where two pulleys have axes returned in parallel relation and one of the pulleys is drivingly carried by a rotary shaft and capable of movement longitudinally of the axes of the pulleys, as in a Jordan engine.

To adapt the invention in drives for driving car lighting generators it may not be necessary to slot a transverse member of a truck frame as disclosed, because of changed designs thereof, and different sizes of driving and driven V-groove pulleys may be necessary to be employed requiring a different length of endless V-belts from that disclosed for the illustrated arrangement in which case the cross-sectional dimensions of the V-belts would only have to be proportionally changed from the stated cross-sectional dimensions of the V-belts required for a railroad car generator drive as illustrated.

To propery defeat the detrimental tendencies of endless V-belts under the conditions of misalignment thereof referred to above, in addition to the consideration of the proper cross-sectional size of the belts for a given length thereof, it has been found to be important to consider the nature of the side driving surfaces of said belts. In general, it may be said that a tacky condition of said surfaces is to be avoided and that a molded type of V-belt known as Type 1 Texrope belt which has hard, glazy, continuous, water-proof side driving surfaces to operate in smooth pulley grooves is the preferred belt to employ and of all the belts that have been experimented with is most satisfactory to preclude the endless V-belts of the misaligning flexible belt drive of this invention from turning over on their sides under conditions of maximum permissible misalignment, assuming the belts to have the proper and correct cross-sectional dimensions as described above, and the grooves in the pulleys to have the proper cooperating form.

In order to further assure the retention of properly selected V-belts in their proper seating positions on the misaligning driving and driven pulleys, it has been found to be beneficial to apply a limited amount of machine oil on the driving surfaces of the grooves in the two pulleys of the straight, flexible V-belt drives of this invention.

A flexible belt, straight drive, according to this invention for the illustrated purpose, has now been in successful operation for a considerable period of time and has been found to be entirely satisfactory, and a "life" of the belts of approximately one year appears to be possible of realization which covers a period far greater than the "life" of the ordinary flat belts heretofore generally used for driving car lighting electric generators.

Although the illustrated embodiment of the invention, in the form of a practical installation of a railroad car drive, employs three endless V-belts of the size stated above, and which replace the five inch standard four-ply rubber, flat belt formerly used, to drive 4 KW generators on certain railroad cars, this invention is not to be limited to railroad car generator drives having the illustrated number of V-belts as their number may be varied with relation to the capacity of the electric generator or other machine to which it is desirable to transmit power from a swiveling rotary element such as the axle of a carriage generally or of the illustrated railroad car. Further the location of the driven pulley 9 with respect to the rotary machine 16 on whose shaft the driven pulley 9 is mounted is immaterial, as long as the grooves in the two pulleys 8 and 9 are in one position in alignment and with the mid points of their grooved surfaces located in this position in the vertical plane determined by the longitudinal medial line of the car body and the swiveling axis of the car truck frame one of whose axles as to serve as the rotary element for mounting of the driving pulley 8.

It is to be understood that it is not desired to limit the invention to the exact details of operation and construction herein shown and described, for various modifications thereof within the scope of the claims may occur to persons skilled in the art.

It is claimed and desired to secure by Letters Patent:

1. A generator drive for railway vehicles or the like, comprising in combination with a vehicle body and a wheeled truck frame swiveled to said vehicle body, an electric generator pivotally suspended from said vehicle body on an axis extending transversely of said body, said generator being provided with a shaft, a pulley on said shaft, a pulley mounted on an axle of said truck frame, said pulleys each having an annular groove, a flexible belt connecting said pulleys and seated in the grooves thereof, the bottom or belt seating portion of each groove being bounded by oppositely inclined driving surfaces conforming generally to the inclination of the side driving surfaces of the cooperating belt, each driving surface of the grooves terminating in an annular guiding surface of a transverse extent comparable to the transverse extent of the side driving surface of the cooperating belt and which extends outwardly generally in the direction of its corresponding driving surface, on which the belt may slide without turning over on its side or climbing out of the grooves when it negotiates the grooves of the pulleys in directions differing substantially from directions at right angles to the axes thereof during rotation of the pulleys.

2. A misaligning belt drive, especially for driving electric generators on railroad cars, comprising driving and driven pulleys each having a peripheral V-shaped groove, and a V-belt running within said grooves, the drive operating in such a manner that the pulley grooves, although primarily set in alignment, are normally liable to substantial misalignment, the side walls of said grooves extending outwardly beyond the outer periphery of said belt in its seated position, and each side wall forming a substantially conical guiding surface of a transverse extent comparable to the transverse extent of the side driving surface of the cooperating belt, on which the belt may slide into its seated position if it approaches the pulleys in directions differing substantially from directions at right angles to the axes thereof during rotation of the pulleys.

3. A misaligning belt drive, especially for driving electric generators on railroad cars, comprising a pulley turning on a normally fixed axis, a pulley turning on a shifting axis, each pulley having an annular groove, a flexible belt connecting said pulleys and seated in the grooves thereof, the bottom portion or belt seating portion of each groove being bounded by oppositely inclined driving surfaces conforming generally to the inclination of the side driving surfaces of the cooperating belt, each driving surface of the grooves terminating in an annular guiding surface of a transverse extent comparable to the transverse extent of the side driving surface of the cooperating belt and which extends outwardly generally in the direction of its corresponding driving surface, on which the belt may slide without turning over on its side or climbing out of the grooves when it negotiates the grooves of the pulleys in directions differing substantially from directions at right angles to the axes thereof during rotation of the pulleys.

4. A misaligning belt drive, especially for driving electric generators on railroad cars, comprising a pulley turning on a normally fixed axis, a pulley turning on a shifting axis, each pulley having an annular groove, a flexible belt connecting said pulleys and seated in the grooves thereof, the bottom portion or belt seating portion of each groove being bounded by oppositely inclined driving surfaces conforming generally to the inclination of the side driving surfaces of the cooperating belt, each driving surface of the grooves terminating in an annular guiding surface which extends outwardly generally in the direction of its corresponding driving surface, on which the belt may slide without turning over on its side or climbing out of the grooves when it negotiates the grooves of the pulleys in directions differing substantially from directions at right angles to the axes thereof during rotation of the pulleys, the transverse extent of each guiding surface being approximately equal to the transverse extent or width of the side driving surface of the belt operating in the grooves.

5. A misaligning belt drive, especially for driving electric generators on railroad cars, comprising a pulley turning on a normally fixed axis, a pulley turning on a shifting axis, each pulley having an annular groove, a flexible belt connecting said pulleys and seated in the grooves thereof, the bottom portion or belt seating portion of each groove being bounded by oppositely inclined driving surfaces conforming generally to the inclination of the side driving surfaces of the cooperating belt, each driving surface of the grooves terminating in an annular guiding surface of a transverse extent comparable to the transverse extent of the side driving surface of the cooperating belt and which extends outwardly generally in the direction of its corresponding driving surface, on which the belt may slide without turning over on its side or climbing out of the grooves when it negotiates the grooves of the pulleys in directions differing substantially from directions at right angles to the axes thereof during rotation of the pulleys, said flexible belt being provided with continuous side driving surfaces of hard, non-tacky, water-proof characteristics.

6. A misaligning belt drive, especially for driving electric generators on railroad cars, comprising a pulley turning on a normally fixed axis, a pulley turning on a shifting axis, each pulley having a plurality of grooves, flexible belts operating in the grooves of said pulleys, the bottom portions or belt seating portions of each groove being bounded by oppositely inclined driving surfaces conforming generally to the inclination of the side driving surfaces of the cooperating belts, each driving surface of the grooves terminating in an annular guiding surface of a transverse extent comparable to the transverse extent of the side driving surface of the cooperating belt and which extends outwardly generally in the direction of its corresponding driving surface, on which the belt may slide without turning over on its side or climbing out of the grooves when they negotiate the grooves of the pulleys in directions differing substantially from directions at right angles to the axes thereof during rotation of the pulleys, the land between each pair of adjacent grooves being bounded by a transverse arcuate annular surface terminating smoothly in the corresponding guiding surfaces, and the belts each having a trapezoidal transverse, solid cross-section throughout their lengths.

7. A V-belt drive mechanism adapted to operate with the plane of operation of the belt at a substantial angle not exceeding 14° 30′ with the plane of rotation of the sheave, comprising a V-belt having smooth side driving faces, and a sheave for cooperating with said V-belt having a smooth V-groove shaped to provide a pair of opposed side driving surfaces adapted to wedgingly engage the side driving faces of said V-belt and a pair of guiding surfaces of width substantially equal to the width of said driving surfaces and forming outward continuations thereof for guiding said belt into engagement with said driving surfaces.

8. A V-belt drive, comprising a pair of sheaves disposed normally in a common plane of rotation but adapted to be moved relatively into operating planes at an angle to each other, each of said sheaves having a smooth V-groove providing opposed side driving surfaces and guiding surfaces extending outwardly from and of width substantially equal to the width of said side driving surfaces, and a V-belt provided with smooth side driving faces disposed upon said sheaves for transmitting torque therebetween, said side driving faces having wedging engagement with said side driving surfaces of the sheaves and being disposed to slide over and be guided into engagement with said driving surfaces by one of said guiding surfaces of each sheave when said belt is operating in a plane at a substantial angle not exceeding 14° 30′ to the plane of rotation of said sheave.

9. A multiple V-belt driving system adapted to operate under conditions of misalinement, that comprises sheaves having smooth V-grooves, and cooperating V-belts having smooth side driving faces disposed to cooperate with the smooth grooves of said sheaves to transmit torque therebetween, each of said grooves presenting side driving surfaces for wedgingly receiving the side driving faces of one of said belts and guiding surfaces extending outwardly from and of width substantially equal to the width of said side driving surfaces for guidingly engaging a face of said belt to guide it into working position in said groove when the plane of operation of said belt is at a substantial angle not exceeding 14° 30′ with the plane of rotation of said sheave.

10. A V-belt drive mechanism adapted to operate with the belt at an angle with the plane of rotation of the sheave not exceeding 14° 30′ that comprises a sheave having a V-groove providing smooth opposed side driving surfaces, smooth guiding surfaces of width substantially equal to and constituting outward extensions of said side driving surfaces, and smooth rounded peripheral terminal portions; and a V-belt having hard smooth side driving faces disposed to wedgingly engage said side driving surfaces and to be guided by one of said guiding surfaces and the corresponding rounded peripheral portion when said sheave is rotating in a plane at a substantial angle not exceeding 14° 30′ to the plane of operation of the belt.

11. A railroad car generator drive mechanism for transmitting power to a generator carried upon a car supported by a swiveling truck from an axle of said truck, that comprises a sheave mounted on the truck axle and having a V-groove providing cooperating side driving surfaces and outwardly extending guiding surfaces substantially equal in width to said driving surfaces, a sheave on said generator, and a V-belt having smooth side driving faces disposed to engage with and transmit power between said sheaves when said truck is swiveled in either direction while said car is traveling over a curved track.

12. A drive mechanism for a railroad car generator comprising a sheave fastened upon an axle of a swiveling truck of a car, said sheave having a smooth belt receiving V-groove presenting opposed side driving surfaces and guiding surfaces constituting outward extensions of said driving surfaces and of width substantially equal to the width of said driving surfaces, a cooperating sheave having a similar V-groove mounted on the generator carried by said car, and a V-belt having smooth side driving faces cooperating with the driving surfaces and the guiding surfaces of the grooves of said sheaves in such manner that said belt remains in wedging relation with said driving surfaces when said swiveling truck is misalined with said car upon the car negotiating a track curve.

13. A railroad car generator drive mechanism for transmitting power from an axle of a swiveling truck to a generator carried by a car supported upon the truck, that comprises a sheave secured upon the truck axle and having a smooth V-groove presenting opposed side driving surfaces adapted to wedgingly receive a V-belt and guiding surfaces constituting outward extensions of said driving surfaces and of width substantially equal thereto, a sheave having a similar V-groove mounted on the generator, and a V-belt having smooth side driving faces disposed in said grooves in wedging engagement with said driving surfaces of each sheave and disposed to slide upon and be guided by one of said guiding surfaces when said belt is operating in a plane at a substantial angle not exceeding 14° 30′ to the plane of rotation of said sheave.

14. A railroad car generator drive mechanism for transmitting power from an axle of a swiveling truck to a generator carried by a car supported upon said truck, that comprises a sheave secured upon the truck axle and having a plurality of smooth V-grooves each presenting opposed side driving surfaces adapted to wedgingly receive a V-belt and guiding surfaces constituting outward extensions of said driving surfaces and of width substantially equal thereto, the peripheral surfaces of said sheave between said grooves being each of arcuate form of radius substantially equal to two-thirds of the depth of the belt adapted to seat upon said driving surfaces to provide a curved surface merging smoothly into said guiding surfaces, a sheave having similar grooves mounted upon the generator, and a plurality of V-belts having smooth side driving faces disposed respectively in corresponding grooves of said sheaves in wedging engagement with said driving surfaces and each being adapted to slide upon and be guided by one of the guiding surfaces of its cooperating groove and the contiguous arcuate peripheral surface into engagement with said driving surfaces when the plane of operation of said sheave is at a substantial angle not greater than 14° 30' to the plane of operation of said belts.

15. A railroad car generator drive mechanism for transmitting power to a generator resiliently carried by a railroad car mounted on a supporting swiveling truck from an axle of said truck, comprising a sheave secured upon said axle and having a plurality of smooth V-grooves each presenting opposed belt receiving side driving surfaces disposed to define an included angle of substantially 40° and belt guiding surfaces of width substantially equal to and constituting outward extensions of said side driving surfaces and a plurality of arcuate peripheral surfaces merging smoothly into the edges of the guiding surfaces of adjacent grooves of radius substantially equal to two-thirds of the depth of the belt adapted to seat upon said driving surfaces, a sheave having a plurality of similar grooves mounted upon the resiliently supported generator, and a plurality of flexible endless V-belts having smooth hard side driving faces disposed respectively in wedging engagement with the side driving surfaces of corresponding grooves of said sheaves, the hard side driving faces of each belt being adapted to slide upon and be guided by the adjacent guiding surface of the corresponding groove and the contiguous arcuate peripheral surface to guide said belt into engagement with said side driving surfaces when said sheave is rotating in a plane at a substantial angle not greater than 14° 30' to the planes of operation of said belts, whereby said belts will operate to drive said generator when said truck is swiveled relative to said car upon traveling over a curved track.

ALFRED A. DAHMS.
THOMAS C. KNUDSEN.